(12) United States Patent
Chen et al.

(10) Patent No.: US 11,061,272 B2
(45) Date of Patent: Jul. 13, 2021

(54) DISPLAY DEVICE AND OPTICAL COMPENSATION MODULE

(71) Applicant: Coretronic Corporation, Hsin-Chu (TW)

(72) Inventors: Ping-Yen Chen, Hsin-Chu (TW); Chung-Yang Fang, Hsin-Chu (TW); Yang-Ching Lin, Hsin-Chu (TW); Jen-Wei Yu, Hsin-Chu (TW); Yu-Fan Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/724,398

(22) Filed: Dec. 23, 2019

(65) Prior Publication Data

US 2020/0209659 A1 Jul. 2, 2020

(30) Foreign Application Priority Data

Dec. 28, 2018 (CN) .......................... 201811620753.7

(51) Int. Cl.
*G02F 1/1335* (2006.01)
*G02F 1/13357* (2006.01)
*G02F 1/13363* (2006.01)

(52) U.S. Cl.
CPC ...... *G02F 1/1336* (2013.01); *G02F 1/133528* (2013.01); *G02F 1/133536* (2013.01); *G02F 1/133633* (2021.01)

(58) Field of Classification Search
None
See application file for complete search history.

(56) References Cited

U.S. PATENT DOCUMENTS

2008/0284715 A1* 11/2008 Kawata ................. G02F 1/1336
345/102
2012/0092586 A1* 4/2012 He ......................... G02B 30/27
349/61
(Continued)

FOREIGN PATENT DOCUMENTS

CN 100426083 10/2008
CN 202886787 4/2013
(Continued)

OTHER PUBLICATIONS

"Office Action of Taiwan Counterpart Application", dated Jan. 31, 2020, pp. 1-7.

*Primary Examiner* — James A Dudek
(74) *Attorney, Agent, or Firm* — JCIPRNET

(57) ABSTRACT

The disclosure provides a display device and an optical compensation module. The display device includes a light emitting display module and the optical compensation module. The optical compensation module is disposed on the light emitting display module along the transmission direction of an image beam emitted by the light emitting display module, and includes: a first polarizing layer and an optical compensation layer. The optical compensation layer is disposed between the light emitting display module and the first polarizing layer along the transmission direction of the image beam and has a first compensation area and a second compensation area which forms a pattern, wherein the phase compensation value of the first compensation area and the phase compensation value of the second compensation area are different. The display device and the optical compensation module have the effect of displaying the pattern on the display panel at a specific angle.

20 Claims, 7 Drawing Sheets

(56) References Cited

U.S. PATENT DOCUMENTS

2018/0088367 A1* 3/2018 Zhong .................. G02B 6/003
2019/0353944 A1* 11/2019 Acreman .......... G02F 1/133528

FOREIGN PATENT DOCUMENTS

| TW | 444148 | 7/2001 |
| TW | 201523030 | 6/2015 |
| WO | 2014131235 | 9/2014 |

* cited by examiner

DISPLAY DEVICE AND OPTICAL COMPENSATION MODULE

CROSS-REFERENCE TO RELATED APPLICATION

This application claims the priority benefit of China application serial no. 201811620753.7, filed on Dec. 28, 2018. The entirety of the above-mentioned patent application is hereby incorporated by reference herein and made a part of this specification.

BACKGROUND OF THE DISCLOSURE

Field of the Disclosure

The disclosure relates to a display device, and more particularly to a display device and an optical compensation module that can show a pattern at a specific viewing angle.

Description of Related Art

At present, with the development of technology, in order to beautify the appearance and compact size of the display device, the display device with narrow bezel has become the mainstream. However, as the bezel becomes narrower and narrower, the trademarks or slogans originally placed on the bezel begin to shrink or even be removed, thus losing the purpose of advertising or distinguishing products. Therefore, it is an issue to be explored to find out how to display a pattern such as a trademark on the display screen without contradicting the narrow bezel design or viewing effect.

The disclosed in this BACKGROUND section is only for enhancement of understanding of the BACKGROUND section of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY OF THE DISCLOSURE

Embodiments of the disclosure provide a display device and an optical compensation module, which have an invisible pattern, and the viewer is not bothered by the invisible pattern when viewing the display screen at a normal viewing angle, but can see the invisible pattern at a specific viewing angle.

The objectives and advantages of the disclosure may be further understood in the technical features disclosed in the disclosure.

To achieve one or a part or all the objectives or other objectives, an embodiment of the disclosure provides a display device. The display device includes a light emitting display module and an optical compensation module. The light emitting display module is configured to emit an image beam. The optical compensation module is disposed on the light emitting display module along a transmission direction of the image beam, and includes: a first polarizing layer and an optical compensation layer. The optical compensation layer is disposed between the light emitting display module and the first polarizing layer along the transmission direction of the image beam and has a first compensation area and a second compensation area which forms a pattern, wherein the phase compensation value of the first compensation area is different from the phase compensation value of the second compensation area.

To achieve one or a part or all the objectives or other objectives, an embodiment of the disclosure provides an optical compensation module. The optical compensation module allows the image beam to penetrate through and includes a first polarizing layer and an optical compensation layer. The optical compensation layer is disposed under the first polarizing layer along the transmission direction of the image beam and has a first compensation area and a second compensation area which forms the pattern, wherein the phase compensation value of the first compensation area is different from the phase compensation value of the second compensation area.

Based on the above, the display device and the optical compensation module of the embodiments of the disclosure have the effect of displaying a pattern on a display screen only at certain viewing angles, and the viewer is not bothered by the pattern when viewing the screen normally.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
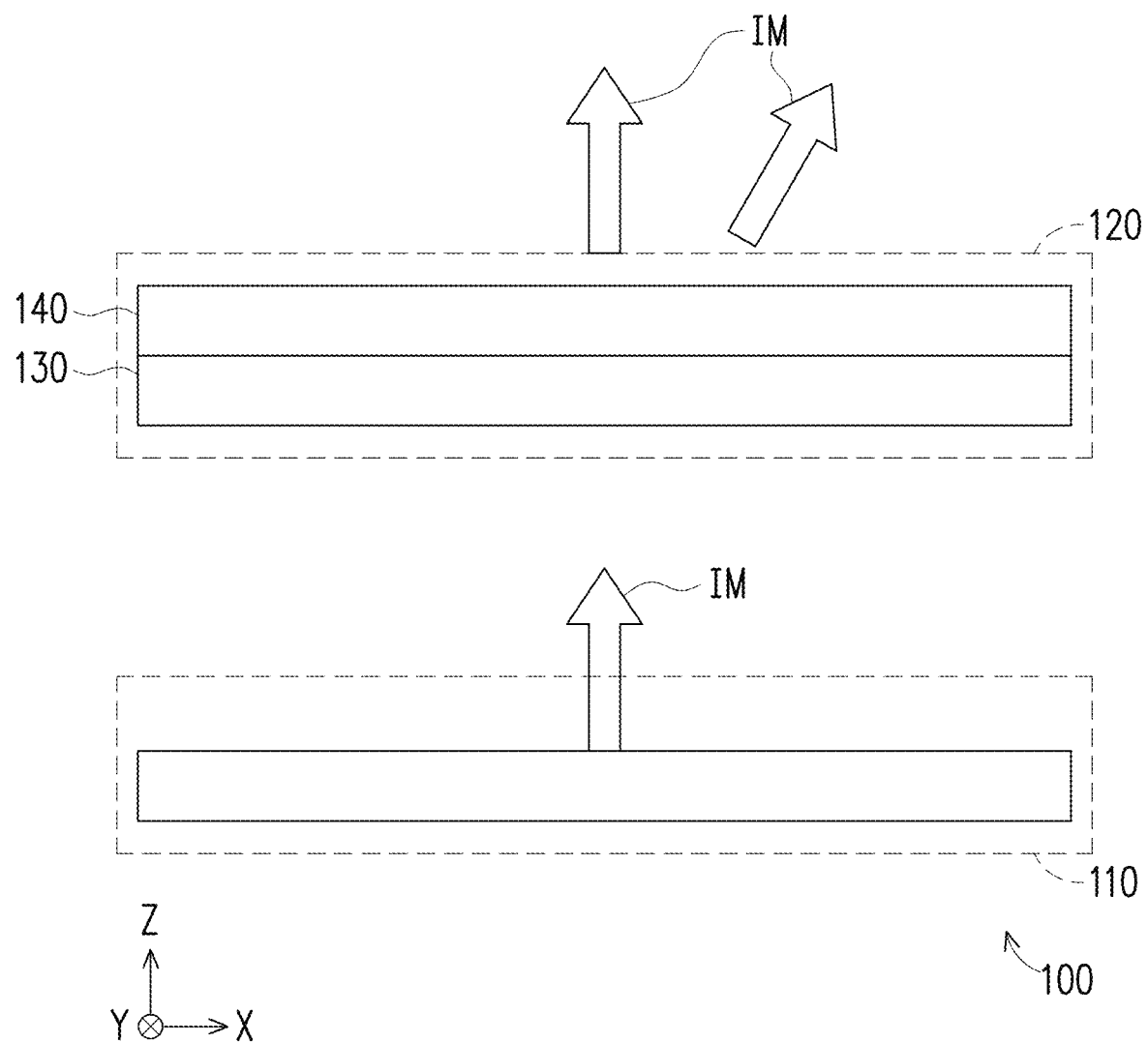
FIG. 1 is a schematic diagram of a display device according to an embodiment of the disclosure.
Figure 2:
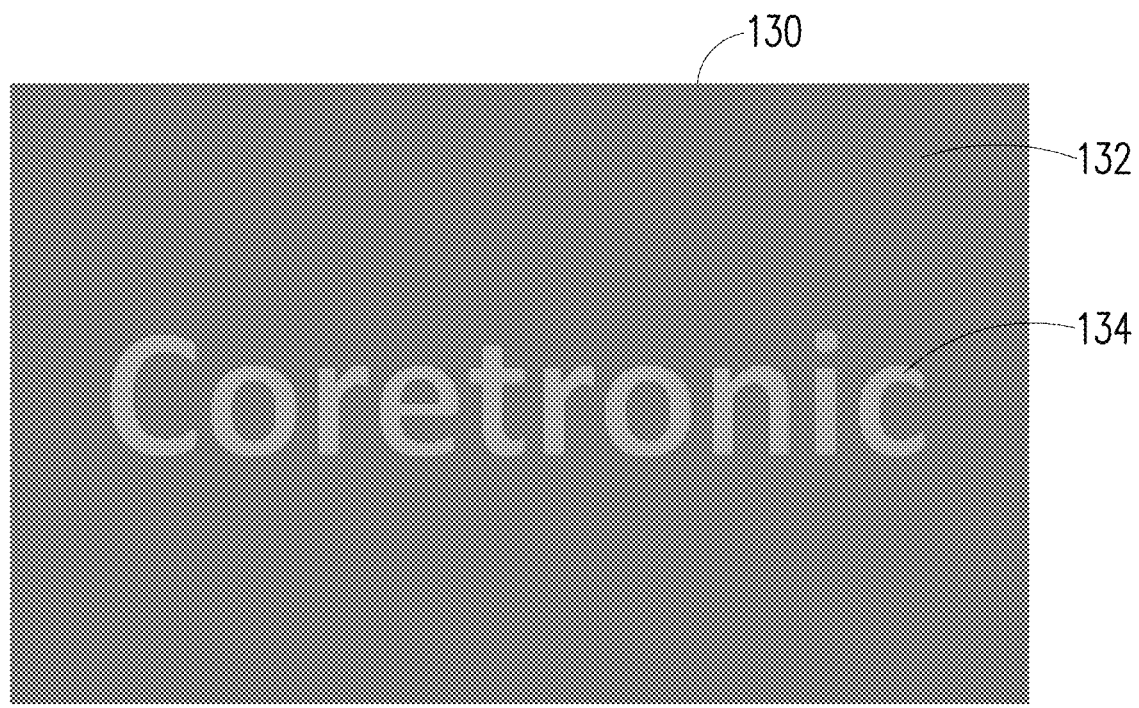
FIG. 2 is a schematic view of an optical compensation layer according to an embodiment of the disclosure.
Figure 2:
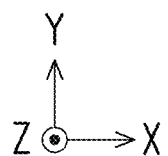

FIG. 1 is a schematic diagram of a display device according to an embodiment of the disclosure. FIG. 2 is a schematic view of an optical compensation layer according to an embodiment of the disclosure. Referring to FIG. 1 and FIG. 2, a display device 100 includes a light emitting display module 110 and an optical compensation module 120. The light emitting display module 110 is configured to emit an image beam IM. The optical compensation module 120 is disposed on the light emitting display module 110 along a transmission direction (for example, the Z direction) of the image beam IM. The optical compensation module 120 includes an optical compensation layer 130 and a first polarizing layer 140. The optical compensation layer 130 is disposed between the light emitting display module 110 and the first polarizing layer 140 along the transmission direction of the image beam IM and has a first compensation area 132 and a second compensation area 134 which forms a pattern, wherein the phase compensation value (for example, phase retardation value) of the first compensation area 132 is different from the phase compensation value of the second compensation area 134.

In the embodiment, the pattern on the surface (e.g., the XY plane of FIG. 2) of the optical compensation layer 130 can be generated by a technique such as imprinting or filling, the disclosure provides no limitation thereto. Here, the pattern portion on the optical compensation layer 130 is referred to as the second compensation area 134, and the remaining original portion on the surface is referred to as the first compensation area 132. In other words, the first compensation area 132 is outside the second compensation area 134, so the first compensation area 132 will fill the portion other than the pattern formed by the second compensation area 134 and surround the second compensation area 134.

In brief, the present embodiment generates an invisible pattern on the surface of the optical compensation layer 130 by using at least two areas having different phase compensation values. The so-called invisible pattern means that the viewer cannot see the pattern at a first viewing angle (for example, a normal viewing angle), but can see it at the second viewing angle (for example, a side viewing angle). In this way, the advertising effectiveness can be achieved without reducing the aesthetic sense of the appearance of the display device or affecting the viewing quality. Specifically, the first viewing angle, for example, falls within a range between equal to or greater than 0 degree and equal to or less than 30 degrees, and the second viewing angle, for example, falls within a range between greater than 30 degrees and equal to or less than 90 degrees, but the disclosure provides no limitation to the range of the first viewing angle and the second viewing angle.

More specifically, the phase compensation value provided by the optical compensation layer 130 includes an in-plane compensation value and an out-of-plane compensation value. In order for the viewer to clearly see the pattern of the second compensation area 134 at the second viewing angle, the difference between the out-of-plane compensation value of the first compensation area 132 and the out-of-plane compensation value of the second compensation area 134 is preferably greater than or equal to 50 nm (nanometer).

Figure 3:
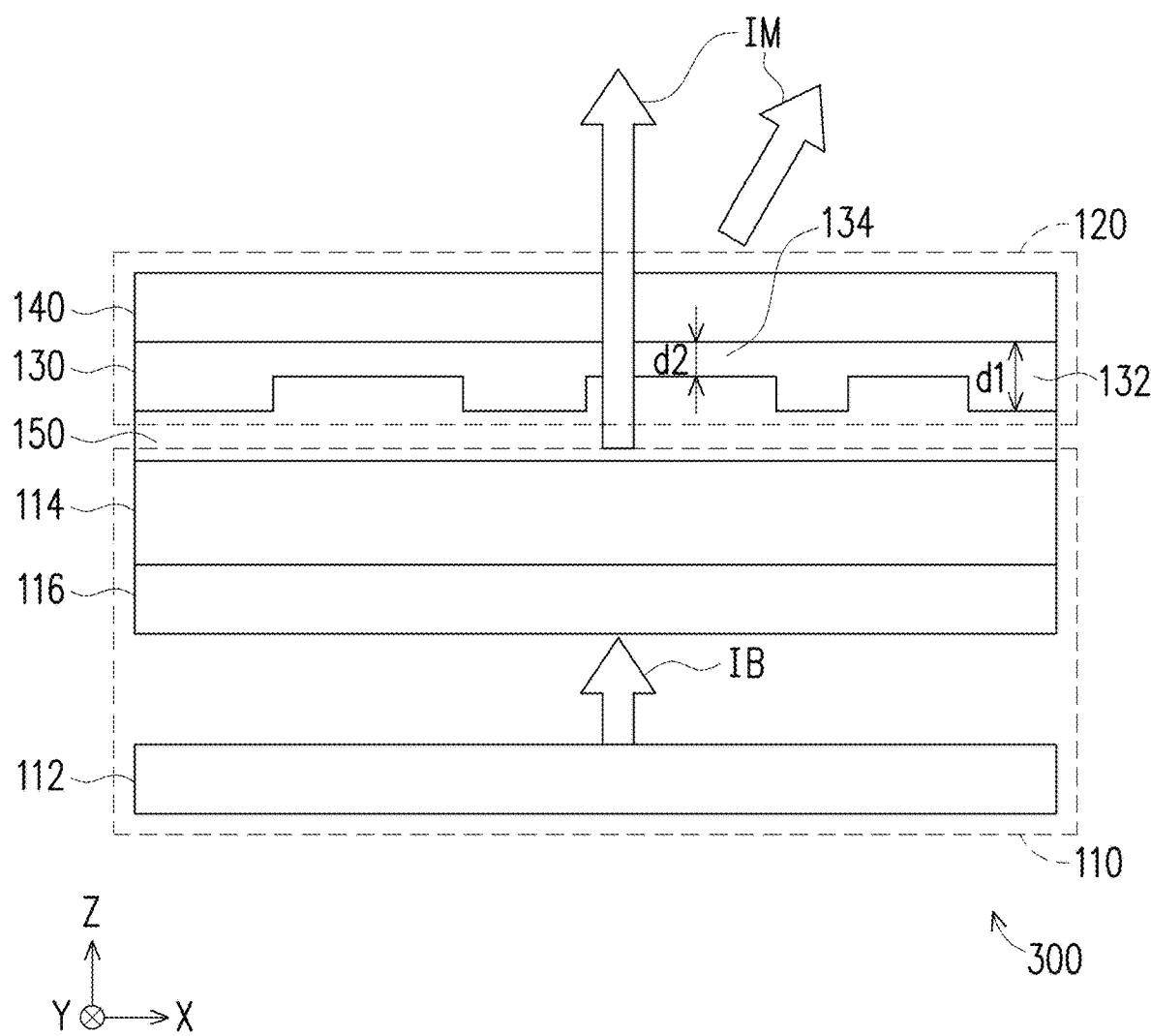
FIG. 3 is a schematic structural view of a display device according to an embodiment of the disclosure.

FIG. 3 is a schematic structural view of a display device according to an embodiment of the disclosure. Referring to FIG. 3, a display device 300 of FIG. 3 is adaptable for the display device 100, and the embodiment of the disclosure is further illustrated with reference to the embodiment of FIG. 3.

In this embodiment, the light emitting display module 110 includes a light emitting layer 112, a liquid crystal display layer 114, and a second polarizing layer 116. The light emitting layer 112 is configured to emit an illumination beam IB. The liquid crystal display layer 114 is disposed on the light emitting layer 112 along the transmission direction of the illumination beam IB, and the second polarizing layer 116 is disposed between the light emitting layer 112 and the liquid crystal display layer 114 along the transmission direction of the illumination beam IB. The illumination beam IB is converted into the image beam IM after passing through the second polarizing layer 116 and the liquid crystal display layer 114.

In the present embodiment, the pattern of the optical compensation layer 130 is formed by imprinting, the pattern is imprinted on the surface of the optical compensation layer 130 facing the liquid crystal display layer 114, and the space between the liquid crystal display layer 114 and the optical compensation layer 130 is filled with optical adhesive 150.

The phase of the image beam IM is adjusted or compensated by passing through the optical compensation layer 130 and the image beam IM continues to penetrate the first polarizing layer 140 to reach the viewer's eyes. The refractive indices of the first compensation area 132 and the second compensation area 134 may be the same, but the thicknesses thereof in the Z direction are different, and therefore, the out-of-plane compensation value of the first compensation area 132 is different from the out-of-plane compensation value of the second compensation area 134.

In this embodiment, the thickness d1 of the first compensation area 132 is greater than the thickness d2 (d2 is located at the concave portion of the gravure printed pattern) of the second compensation area 134. In other embodiments, the thickness d1 of the first compensation area 132 may be smaller than the thickness d2 (d2 is located at the convex portion of the letterpress printed pattern) of the second compensation area 134, but not limited thereto.

Figure 4A:
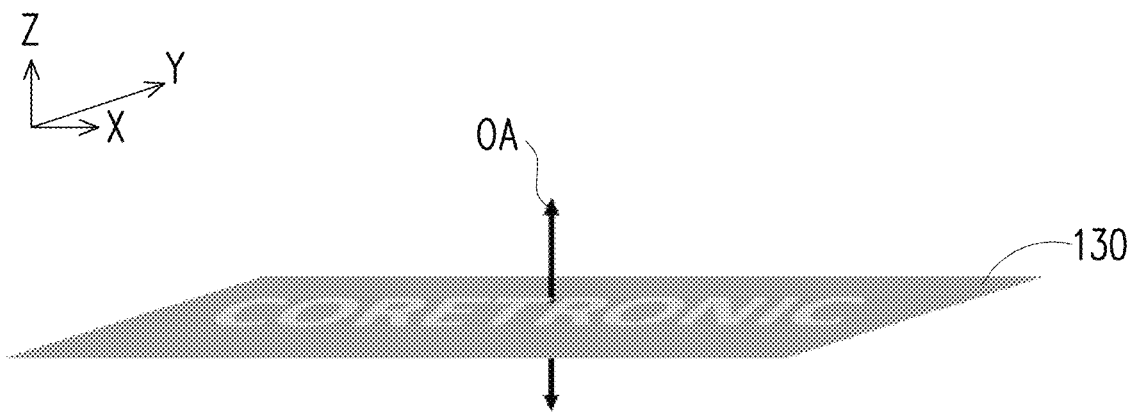
FIG. 4A is a schematic view of an optical axis direction of an optical compensation layer according to an embodiment of the disclosure.

FIG. 4A is a schematic view of an optical axis direction of an optical compensation layer according to an embodiment of the disclosure. Referring to FIG. 4A with reference to FIG. 3, the optical compensation layer 130 may be a C-plate compensation film of which the optical axis OA may be perpendicular to the plane of the optical compensation layer 130, such as the X-Y plane in FIG. 4A. The in-plane compensation value of the first compensation area 132 and the in-plane compensation value of the second compensation area 134 may both be 0 or the same, but the out-of-plane compensation value of the first compensation area 132 is different from the out-of-plane compensation value of the second compensation area 134.

Figure 4B:
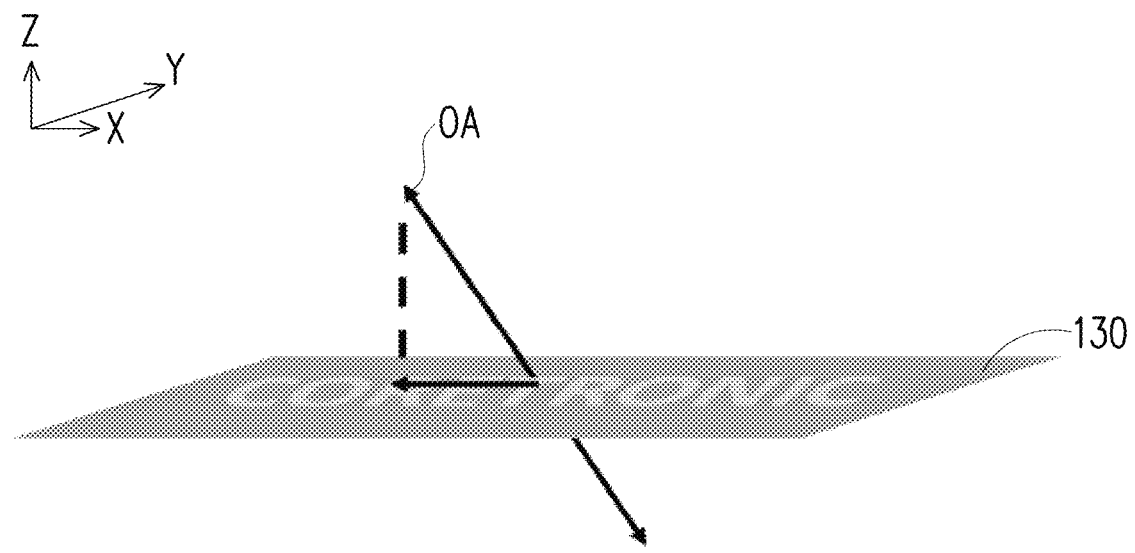
FIG. 4B is a schematic view of an optical axis direction of an optical compensation layer according to another embodiment of the disclosure.

FIG. 4B is a schematic view of an optical axis direction of an optical compensation layer according to another embodiment of the disclosure. Referring to FIG. 4B with reference to FIG. 3, the optical compensation layer 130 may also be an O-plate compensation film or a biaxial compensation film, and the optical axis OA may not be perpendicular to the plane of the optical compensation layer 130. When the optical axis OA of the optical compensation layer 130 is not perpendicular to the X-Y plane of the optical compensation layer 130, the projection direction the optical axis OA of the optical compensation layer 130 on the X-Y plane of the optical compensation layer 130 is parallel with or perpendicular to the polarization direction of the first polarizing layer 140. Similar to the above embodiment, the out-of-plane compensation value of the first compensation area 132 is still different from the out-of-plane compensation value of the second compensation area 134, but the in-plane compensation value of the compensation area 132 and the in-plane compensation value of the second compensation area 134 may be the same or different at this time.

Figure 5A:
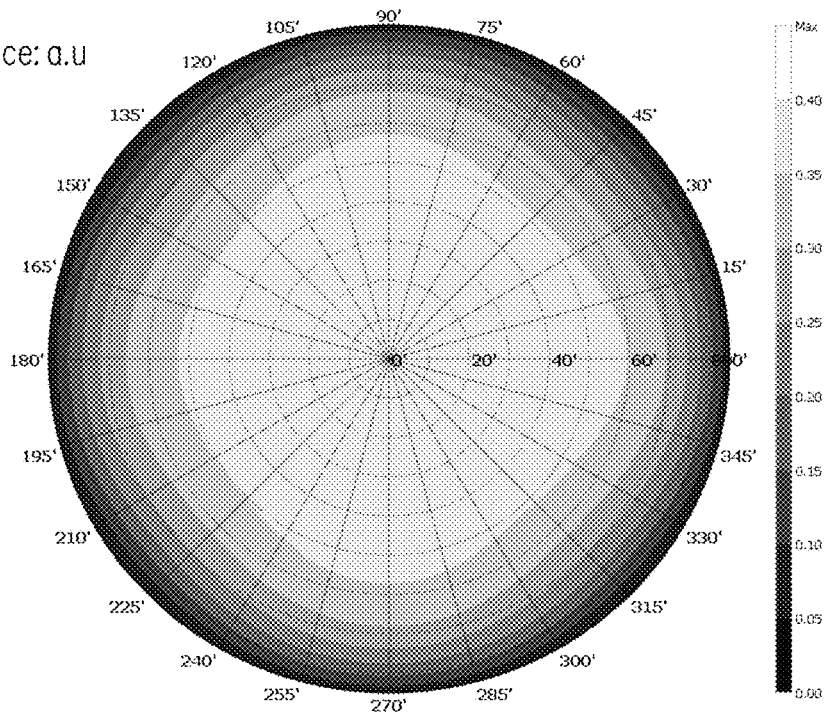
FIG. 5A is a diagram showing the transmittance of a first compensation area that is changed along with viewing angle according to an embodiment of the disclosure.
Figure 5B:
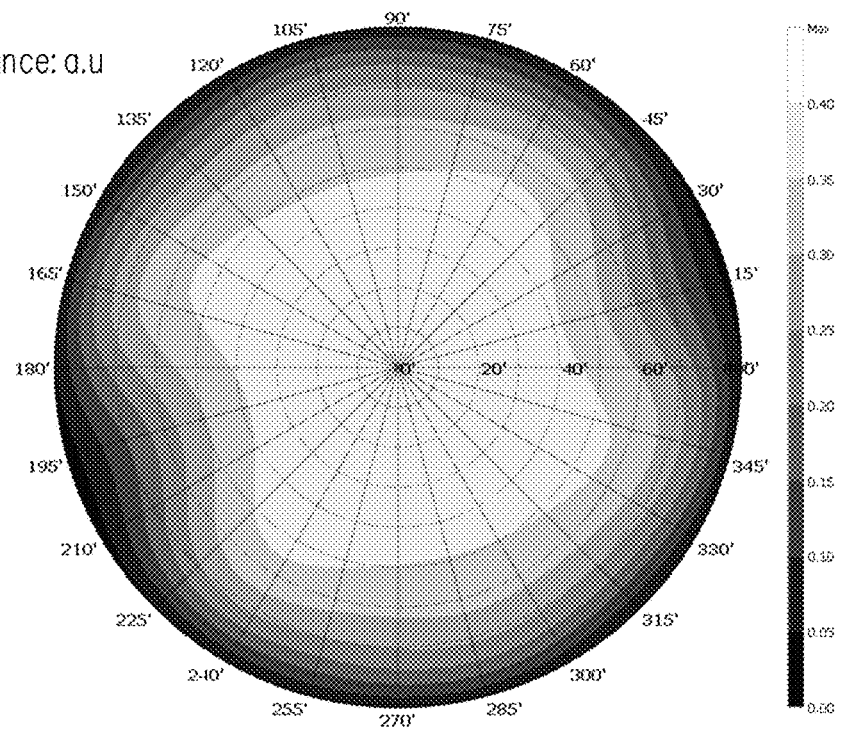
FIG. 5B is a diagram showing the transmittance of a second compensation area that is changed along with viewing angle according to an embodiment of the disclosure.

FIG. 5A is a diagram showing the transmittance of a first compensation area that is changed along with viewing angle according to an embodiment of the disclosure. FIG. 5B is a diagram showing the transmittance of a second compensation area that is changed along with viewing angle according to an embodiment of the disclosure. Referring to FIG. 5A and FIG. 5B, in the embodiment, the out-of-plane compensation value of the first compensation area 132 is 0 nm, and the out-of-plane compensation value of the second compensation area 134 is 150 nm. It can be seen from FIG. 5A and FIG. 5B that the transmittances of the first compensation area 132 and the second compensation area 134 at the normal viewing angle (vertical viewing angle) are the same or almost the same, but the transmittances at the side viewing angle begin to be significantly different, especially in the range of azimuth 15 degrees and elevation 40 to 60 degrees, and azimuth 195 degrees and elevation 40 to 60 degrees. This result indicates that the viewer does not see a difference between the first compensation area 132 and the second compensation area 134 at the normal viewing angle (first viewing angle) in the screen, but the difference of brightness or color between the first compensation area 132 and the second compensation area 134 will show in the screen at some side viewing angles (for example, the second viewing angle), and therefore the viewer can see the pattern formed by the second compensation area 134 at some side viewing angles.

For the present embodiment, the viewer does not see the pattern of the second compensation area 134 at the first viewing angle (normal viewing angle), but can see the pattern of the second compensation area 134 at the second viewing angle (side viewing angle). Specifically, the first viewing angle, for example, falls within a range between equal to or greater than 0 degree and equal to or less than 30 degrees, and the second viewing angle, for example, falls within a range between greater than 30 degrees and equal to or less than 90 degrees, but the disclosure provides no limitation to the first viewing angle and the second viewing angle.

Figure 6:
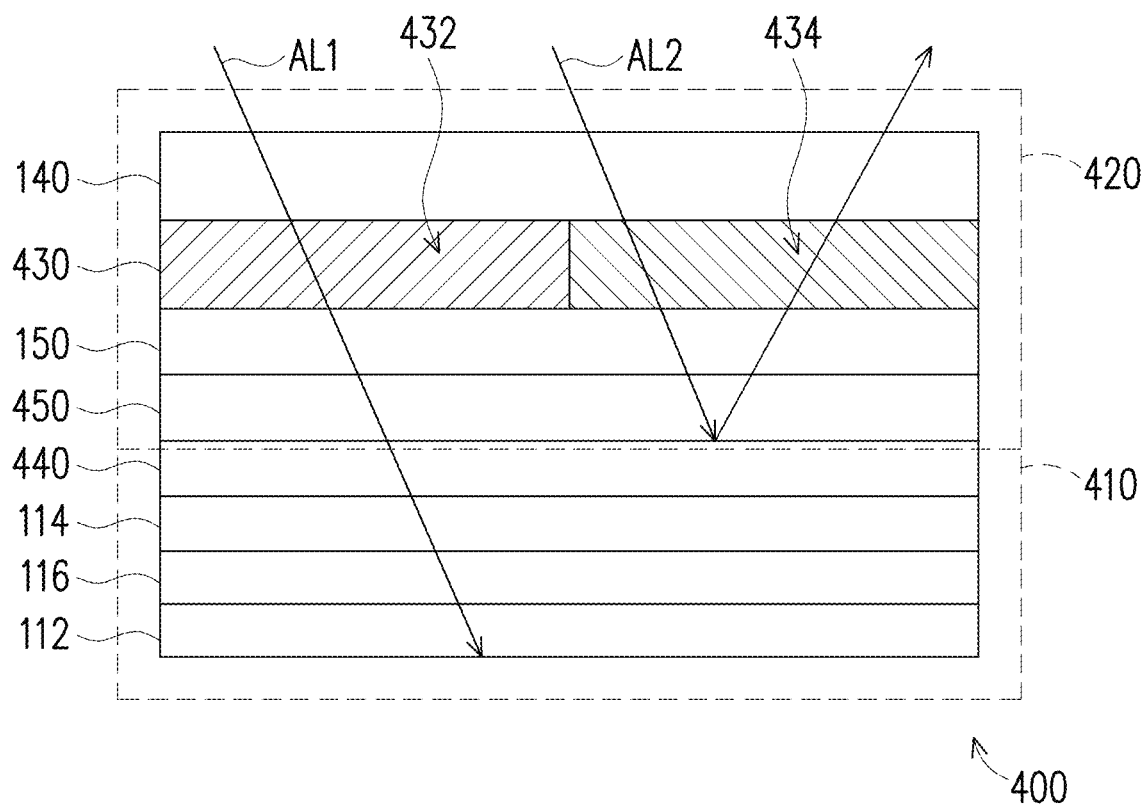
FIG. 6 is a schematic structural view of a display device according to an embodiment of the disclosure.

FIG. 6 is a schematic structural view of a display device according to an embodiment of the disclosure. Please refer to FIG. 6, a display device 400 of FIG. 6 is adaptable for the display device 100. The display device 400 includes a light emitting display module 410 and an optical compensation module 420. As compared with the light emitting display module 110, the light emitting display module 410 not only includes the light emitting layer 112, the liquid crystal display layer 114 and the second polarizing layer 116, but also includes a third polarizing layer 440. As compared with the optical compensation module 120, the optical compensation module 420 not only includes an optical compensation layer 430 and the first polarizing layer 140, but also includes a reflective polarizing layer 450. In the present embodiment, the optical adhesive 150 is disposed between the reflective polarizing layer 450 and the optical compensation layer 430, but not limited thereto.

The reflective polarizing layer 450 is disposed between the light emitting display module 410 and the optical compensation layer 430 along the transmission direction of the image beam IM (as shown in FIG. 3). Specifically, the reflective polarizing layer 450 has the same polarization direction as the first polarizing layer 140. The third polarizing layer 440 is disposed between the liquid crystal display layer 114 and the reflective polarizing layer 450 along the transmission direction of the illumination beam B3 (as shown in FIG. 3), wherein the third polarizing layer 440 has the same polarization direction as the first polarizing layer 140.

In the present embodiment, the pattern of the optical compensation layer 430 is formed differently from the optical compensation layer 130 of FIG. 3. The pattern of the optical compensation layer 430 is composed of materials having at least two different refractive indices. The thickness of the first compensation area 432 and the second compensation area 434 of the optical compensation layer 430 may be the same, but the refractive indices of the first compensation area 432 and the second compensation area 434 are different, and thus the out-of-plane compensation value of the first compensation area 432 is still different from the out-of-plane compensation value of the second compensation area 434, especially the difference between the out-of-plane compensation value of the first compensation area 432 and the out-of-plane compensation value of the second compensation area 434 is preferably greater than or equal to 50 nm (nanometer).

The reflective polarizing layer 450 is configured to reflect a part of the ambient light. In detail, since the out-of-plane compensation value of the first compensation area 432 is different from the out-of-plane compensation value of the second compensation area 434, the ambient light penetrating the first compensation area 432 and the ambient light penetrating the second compensation area 434 at some incident angles may have different phases. Similar to the embodiments of FIG. 5A and FIG. 5B, at the normal viewing angle, the first compensation area 432 and the second compensation area 434 have similar effects on ambient light, but at certain angles, the first compensation area 432 and the second compensation area 434 have different effects on ambient light. The difference is sufficient for the viewer to perceive the difference between the first compensation area 432 and the second compensation area 434.

In the present embodiment, the reflective polarizing layer 450 may allow the ambient light penetrating the first compensation area 432 and the second compensation area 434 to penetrate when the viewer is at the first viewing angle (e.g., a normal viewing angle), but when the viewer is at the second viewing angle (e.g., side viewing angle), the reflective polarizing layer 450 only reflects one of the ambient light penetrating the first compensation area 432 and the ambient light penetrating the second compensation area 434 to reach the viewer, and allows the other one of the ambient light penetrating the first compensation area 432 and the ambient light penetrating the second compensation area 434 to penetrate.

In FIG. 6, the ambient light AL1 penetrates the first compensation area 432, and the ambient light AL2 penetrates the second compensation area 434. The obliquely incident ambient light AL1 penetrates the first polarizing layer 140 and the first compensation area 432, and continues to penetrate the reflective polarizing layer 450. After the obliquely incident ambient light AL2 penetrates the first polarizing layer 140 and the second compensation area 434, at least a part of the ambient light AL2 is reflected by the reflective polarizing layer 450 due to the influence of the phase difference caused by the second compensation area 434, and again penetrates the first polarizing layer 140 to reach the viewer's eyes. Therefore, the viewer does not see the pattern of the second compensation area 434 at the first viewing angle (normal viewing angle), but can see the pattern of the second compensation area 434 at the second viewing angle (side viewing angle).

Briefly, in the present embodiment, when the display device 400 is turned on, the viewer at the normal viewing angle can view the images played by the display device 400, but is not bothered by the pattern of the second compensation area 434. However, when the viewer is not directly in front of the display device 400, but at some side viewing angles, the viewer will see the pattern of the second compensation area 434. In addition, when the display device 400 is turned off, the viewer at the normal viewing angle still cannot see the pattern of the second compensation area 434, but at some side viewing angles, the viewer can see the pattern of the second compensation area 434 through the reflected ambient light. Specifically, when the display device 400 is turned on, the viewing angle at which the pattern of the second compensation area 434 can be seen is not necessarily the same as when the display device 400 is turned off, and the disclosure provides no limitation thereto.

In some embodiments, the optical compensation layer 430 can be disposed on the light emitting display module 410 by attaching or the like, so that the optical compensation layer 430 can be flexibly applied to different display products in a modular manner.

Figure 7:
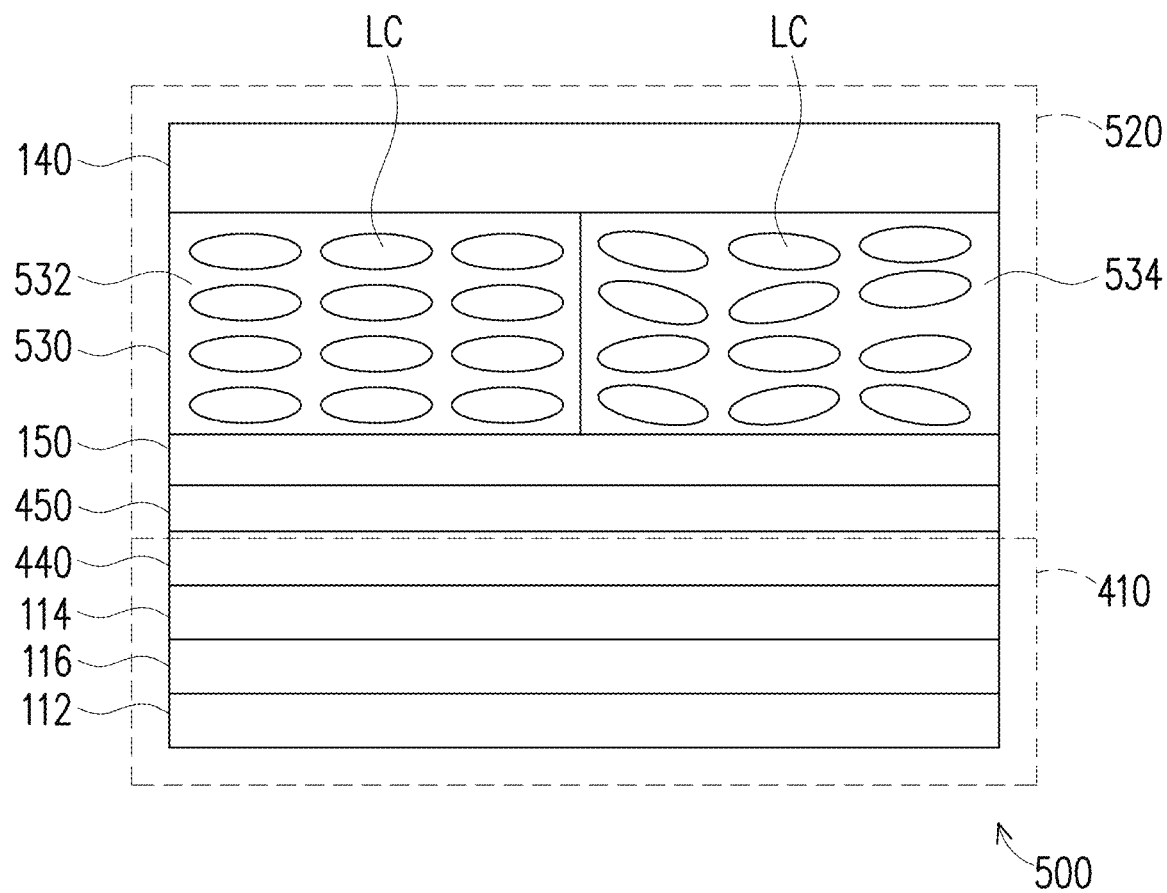
FIG. 7 is a schematic structural view of a display device according to an embodiment of the disclosure.

FIG. 7 is a schematic structural view of a display device according to an embodiment of the disclosure. Referring to FIG. 7, a display device 500 of FIG. 7 is similar to the display device 400. The display device 500 includes a light emitting display module 410 and an optical compensation module 520. The optical compensation layer 530 of the optical compensation module 520 is a liquid crystal coated compensation film, and the alignment of the first compensation area 532 and that of the second compensation area 534 are different.

In this embodiment, the thickness of the first compensation area 532 and the second compensation area 534 may be the same and use the same liquid crystal material, but the liquid crystal LC in the first compensation area 532 and the second compensation area 534 has different arrangement directions through different alignment methods, thereby achieving the purpose of different out-of-plane compensation values, wherein the difference between the out-of-plane compensation value of the first compensation area 532 and the out-of-plane compensation value of the second compensation area 534 is preferably greater than or equal to 50 nm (nanometer).

In FIG. 7, the first compensation area 532 has an alignment region, so that the liquid crystal LC is lying flat and arranged regularly, and the second compensation area 534 does not have an alignment region, so the unaligned liquid crystal LC is substantially lying flat, but the optical axis of each of the liquid crystal molecules is still rotated, and the rotating directions are not uniform but randomly distributed. Therefore, the out-of-plane compensation value of the second compensation area 534 is overall smaller than the out-of-plane compensation value of the first compensation area 532. However, the disclosure provides no limitation to the alignment method of the optical compensation module 520. In another embodiment, it may be that the first compensation area 532 does not have an alignment region and the second compensation area 534 has an alignment region, or the alignment directions of the two compensation areas are different.

In addition, the related embodiments and the configuration relationship of the display device 500 of FIG. 7 are sufficiently taught, suggested, and implemented in the foregoing embodiments and implementations, and therefore are not described again.

In other embodiments, the second compensation area may be divided into a plurality of sub-areas, and these sub-areas have different out-of-plane compensation values through different thicknesses, or different refractive indices, or different alignment methods and alignment condition of liquid crystal molecules between the sub-areas. By adjusting the change of the out-of-plane compensation value of the second compensation area, the pattern can exhibit a gradual change or a change in color.

In addition, the first compensation area and the second compensation area of the optical compensation layer of the disclosure cause a phase difference between light passing through the two areas due to factors such as thickness difference, refractive index difference, etc., but the technical means of the disclosure has different effects from the gratings or other periodical structures in the existing technology. When the viewer is directly in front of the display device of the disclosure, the viewer does not see the pattern of the optical compensation layer, and the brightness or color of the display device is not affected by the difference between the first compensation area and the second compensation area. That is, at the first viewing angle, the phase compensation values of the optical compensation layer of the disclosure does not affect the integrity of the display images, but when the viewer moves to the oblique direction of the display device, the viewer can see the pattern hidden in the optical compensation layer. On the other hand, in the case of the grating or other periodic structures of the existing art, the brightness or color is likely to be affected when the viewer faces the display device, and the image quality is degraded.

In summary, an exemplary embodiment of the disclosure provides a display device and an optical compensation module. The display device includes an optical compensation module. The optical compensation module has a first compensation area and a second compensation area, wherein the second compensation area forms a pattern on the surface of the optical compensation module. The phase compensation values of the first compensation area and the second compensation area are different, which causes that the beams have phase difference at some viewing angles after penetrating the first compensation area and the second compensation area, thus causing difference in brightness or color. As a result, the viewer does not see the pattern of the optical compensation module at the normal viewing angle, but can see the pattern at a specific viewing angle. Therefore, the display device and the optical compensation module of the embodiments of the present disclosure have a simple structure, and have the effect of displaying a pattern on the display panel at a specific angle.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising: a light emitting display module and an optical compensation module, wherein:
    the light emitting display module is configured to emit an image beam; and
    the optical compensation module without electrodes is disposed on the light emitting display module along a transmission direction of the image beam, and comprises:
        a first polarizing layer;
        an optical compensation layer, disposed between the light emitting display module and the first polarizing layer along the transmission direction of the image beam and having a first compensation area and a second compensation area which forms a pattern,
        wherein a phase compensation value of the first compensation area is different from a phase compensation value of the second compensation area; and
        a reflective polarizing layer, disposed between the light emitting display module and the optical compensation layer along the transmission direction of the image beam, wherein the reflective polarizing layer has the same polarization direction as the first polarizing layer.

2. The display device according to claim 1, wherein the optical compensation layer is a C-plate compensation film, the C-plate compensation has a first refractive index in a first direction, a second refractive index in a second direction and a third refractive index in a third direction, the first refractive index is equal to the second refractive index, the first refractive index and the second refractive index are not equal to the third refractive index, the first direction, the second direction and the third direction are perpendicular to each other; the first direction and the second direction are located at a plane of the optical compensation layer, and the optical axis of the C-plate compensation film is parallel to the third direction.

3. The display device according to claim 2, wherein the phase compensation value comprises an out-of-plane compensation value, wherein an out-of-plane compensation value of the first compensation area is different from an out-of-plane compensation value of the second compensation area.

4. The display device according to claim 1, wherein when an optical axis of the optical compensation layer is not perpendicular to a plane of the optical compensation layer, a projection direction of the optical axis of the optical compensation layer on the plane of the optical compensation layer is parallel with or perpendicular to a polarization direction of the first polarizing layer.

5. The display device according to claim 4, wherein the phase compensation value comprises an out-of-plane compensation value, wherein an out-of-plane compensation value of the first compensation area is different from an out-of-plane compensation value of the second compensation area.

6. The display device according to claim 1, wherein the first compensation area has the same refractive index as the second compensation area, but a thickness of the first compensation area is different from a thickness of the second compensation area.

7. The display device according to claim 1, wherein the first compensation area has the same thickness as the second compensation area, but a refractive index of the first compensation area is different from a refractive index of the second compensation area.

8. The display device according to claim 1, wherein the optical compensation layer is a liquid crystal coated compensation film, and an alignment of the first compensation area is different from that of the second compensation area, the second compensation area does not have an alignment region, and rotating directions of liquid crystal molecules of the second compensation area are not uniform but randomly distributed.

9. The display device according to claim 1, wherein the light emitting display module comprises a light emitting layer, a liquid crystal display layer and a second polarizing layer, wherein:
    the light emitting layer is configured to emit an illumination beam;
    the liquid crystal display layer is disposed on the light emitting layer along a transmission direction of the illumination beam; and
    the second polarizing layer is disposed between the light emitting layer and the liquid crystal display layer along the transmission direction of the illumination beam, and the illumination beam is converted into the image beam after penetrating the liquid crystal display layer and the second polarizing layer.

10. The display device according to claim 9, wherein the light emitting display module further comprises:
a third polarizing layer, disposed between the liquid crystal display layer and the reflective polarizing layer along the transmission direction of the illumination beam, and having the same polarization direction as the first polarizing layer.

11. The display device according to claim 1, wherein a viewer does not see the pattern of the second compensation area at a first viewing angle, and sees the pattern of the second compensation area at a second viewing angle, the first viewing angle is greater than or equal to 0 degree and less than or equal to 30 degrees, and the second viewing angle is greater than 30 degrees and less than or equal to 90 degrees.

12. An optical compensation module without electrodes configured to allowing an image beam to penetrate and comprising a first polarizing layer and an optical compensation layer, wherein:
the optical compensation layer is disposed under the first polarizing layer along a transmission direction of the image beam and has a first compensation area and a second compensation area which forms a pattern,
wherein a phase compensation value of the first compensation area is different from a phase compensation value of the second compensation area,
the optical compensation layer is a C-plate compensation film, the C-plate compensation has a first refractive index in a first direction, a second refractive index in a second direction and a third refractive index in a third direction, the first refractive index is equal to the second refractive index, the first refractive index and the second refractive index are not equal to the third refractive index, the first direction, the second direction and the third direction are perpendicular to each other; the first direction and the second direction are located at a plane of the optical compensation layer, and the optical axis of the C-plate compensation film is parallel to the third direction.

13. The optical compensation module according to claim 12, further comprising:
a reflective polarizing layer, wherein the optical compensation layer is disposed between the reflective polarizing layer and the first polarizing layer, and the reflective polarizing layer has the same polarization direction as the first polarizing layer.

14. The optical compensation module according to claim 12, wherein the phase compensation value comprises an out-of-plane compensation value, wherein an out-of-plane compensation value of the first compensation area is different from an out-of-plane compensation value of the second compensation area.

15. The optical compensation module according to claim 12, wherein when an optical axis of the optical compensation layer is not perpendicular to a plane of the optical compensation layer, a projection direction of the optical axis of the optical compensation layer on the plane of the optical compensation layer is parallel with or perpendicular to a polarization direction of the first polarizing layer.

16. The optical compensation module according to claim 15, wherein the phase compensation value comprises an out-of-plane compensation value, wherein an out-of-plane compensation value of the first compensation area is different from an out-of-plane compensation value of the second compensation area.

17. The optical compensation module according to claim 12, wherein the first compensation area has the same refractive index as the second compensation area, but a thickness of the first compensation area is different from a thickness of the second compensation area.

18. The optical compensation module according to claim 12, wherein the first compensation area has the same thickness as the second compensation area, but a refractive index of the first compensation area is different from a refractive index of the second compensation area.

19. The optical compensation module according to claim 12, wherein the optical compensation layer is a liquid crystal coated compensation film, and an alignment of the first compensation area is different from that of the second compensation area, the second compensation area does not have an alignment region, and rotating directions of liquid crystal molecules of the second compensation area are not uniform but randomly distributed.

20. The optical compensation module according to claim 12, wherein a viewer does not see the pattern of the second compensation area at a first viewing angle, and sees the pattern of the second compensation area at a second viewing angle, the first viewing angle is greater than or equal to 0 degree and less than or equal to 30 degrees, and the second viewing angle is greater than 30 degrees and less than or equal to 90 degrees.

* * * * *